US012731366B2

(12) United States Patent
Bindigan Hariprasanna et al.

(10) Patent No.: US 12,731,366 B2
(45) Date of Patent: Sep. 8, 2026

(54) COMPUTATIONALLY ADAPTIVE OCCLUSION AWARE HAND LANDMARK ESTIMATION

(71) Applicant: Samsung Electronics Co., Ltd., Suwon-si (KR)

(72) Inventors: Pawan Prasad Bindigan Hariprasanna, Bengaluru (IN); Green Rosh K S, Bengaluru (IN); Vishakha S R, Bengaluru (IN); Sungsoo Choi, Suwon-si (KR); Hyuntaek Woo, Suwon-si (KR); Chaeeun Lee, Suwon-si (KR); Beomsu Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 186 days.

(21) Appl. No.: 18/671,412

(22) Filed: May 22, 2024

(65) Prior Publication Data

US 2024/0312176 A1 Sep. 19, 2024

Related U.S. Application Data

(63) Continuation of application No. PCT/KR2024/003187, filed on Mar. 12, 2024.

(30) Foreign Application Priority Data

Mar. 15, 2023 (IN) ............................ 202341017582
Feb. 13, 2024 (IN) ............................ 2023 41017582

(51) Int. Cl.
*G06V 40/10* (2022.01)
*G06V 10/26* (2022.01)
*G06V 10/82* (2022.01)

(52) U.S. Cl.
CPC ............ *G06V 10/273* (2022.01); *G06V 10/82* (2022.01); *G06V 40/11* (2022.01)

(58) Field of Classification Search
CPC ...... G06V 40/11; G06V 10/82; G06V 10/273; G06T 2207/30196; G06T 2207/20081
See application file for complete search history.

(56) References Cited

U.S. PATENT DOCUMENTS 6,674,877 B1 * 1/2004 Jojic ...................... G06T 7/251 348/169
9,002,099 B2 4/2015 Litvak et al.
(Continued)

FOREIGN PATENT DOCUMENTS

CN 111027407 A 4/2020
CN 111191632 A 5/2020
(Continued)

OTHER PUBLICATIONS

Gu Y, Zhang H, Kamijo S. Multi-Person Pose Estimation Using an Orientation and Occlusion Aware Deep Learning Network. Sensors (Basel). Mar. 12, 2020;20(6):1593. doi: 10.3390/s20061593. PMID: 32178461; PMCID: PMC7146407. (Year: 2020).*
(Continued)

*Primary Examiner* — Michael Robert Cammarata
(74) *Attorney, Agent, or Firm* — Jefferson IP Law, LLP

(57) ABSTRACT

A method performed by an electronic device for estimating a landmark point of a body part of subject by electronic device is provided. The method includes generating, by the electronic device, an initial coarse estimation of the landmark point of the body part using a light-weight deep neural network, determining, by the electronic device, an occluded region of the body part based on the generated initial coarse estimation of the landmark point using a segmentation mask, estimating, by the electronic device, the occlusion probability for the landmark point in the at least one occluded region
(Continued)

and the generated initial coarse estimation, determining, by the electronic device, a correction factor for applying on the generated initial coarse estimation as a measure of the estimated occlusion probability, and selecting, by the electronic device, a pre-defined number of neural networks by applying the determined correction factor for processing the at least one occluded region and the generated initial coarse estimation to generate final estimation of the landmark point.

20 Claims, 9 Drawing Sheets

(56) References Cited

U.S. PATENT DOCUMENTS 10,929,654 B2 2/2021 Iqbal et al.
11,783,496 B2 * 10/2023 Bazarevsky ............ G06T 7/251 382/103
2009/0041297 A1 * 2/2009 Zhang ..................... G06T 7/251 382/103
2011/0081053 A1 * 4/2011 Zheng ................. G06F 18/2136 382/118
2015/0110349 A1 * 4/2015 Feng .................... G06V 40/162 382/103
2015/0347822 A1 * 12/2015 Zhou ...................... G06V 10/82 382/118
2018/0232902 A1 * 8/2018 Albadawi ................. G01S 5/28
2018/0365512 A1 12/2018 Molchanov et al.
2020/0372246 A1 11/2020 Chidananda et al.
2020/0410753 A1 12/2020 Molyneaux
2021/0133428 A1 * 5/2021 Gernoth ............... G06V 40/171
2021/0174519 A1 * 6/2021 Bazarevsky ............ G06T 7/251
2021/0182625 A1 6/2021 Arar et al.
2022/0076433 A1 * 3/2022 Bazarevsky ............ G06T 7/251
2022/0193888 A1 * 6/2022 Rephaeli ..................... B25J 9/04
2023/0162472 A1 * 5/2023 Gor ........................ G06V 20/59 382/100
2025/0086820 A1 * 3/2025 Raitarovskyi ............. G06T 7/70
2025/0292616 A1 * 9/2025 Lin ........................... G06T 9/00

FOREIGN PATENT DOCUMENTS

CN 115131843 A 9/2022
IN 202011043049 3/2020
KR 10-2305403 B1 9/2021
KR 10-2022-0164376 A 12/2022
WO WO-2025042229 A1 * 2/2025 ............... H04L 5/00

OTHER PUBLICATIONS

G. Yan, Z. Wang, S. Geng, Y. Yu and Y. Guo, “Part-Based Representation Enhancement for Occluded Person Re-Identification,” in IEEE Transactions on Circuits and Systems for Video Technology, vol. 33, No. 8, pp. 4217-4231, Aug. 2023, doi: 10.1109/TCSVT.2023.3241764. (Year: 2023).*

B. Chen, T.-J. Chin and M. Klimavicius, “Occlusion-Robust Object Pose Estimation with Holistic Representation,” 2022 IEEE/CVF Winter Conference on Applications of Computer Vision (WACV), Waikoloa, HI, USA, 2022, pp. 2223-2233, doi: 10.1109/WACV51458.2022.00228. (Year: 2022).*

C. Cimarelli, et al, “A case study on the impact of masking moving objects on the camera pose regression with CNNs,” 2019 16th IEEE Intl Conf on Advanced Video and Signal Based Surveillance (AVSS), Taipei, Taiwan, 2019, pp. 1-8, doi: 10.1109/AVSS.2019.8909904 (Year: 2019).*

L. Ke, M.-C. Chang, H. Qi and S. Lyu, “DetPoseNet: Improving Multi-Person Pose Estimation via Coarse-Pose Filtering,” in IEEE Transactions on Image Processing, vol. 31, pp. 2782-2795, 2022, doi: 10.1109/TIP.2022.3161081. (Year: 2022).*

Mohamed S. Abdallah et al., “Light-Weight Deep Learning Techniques with Advanced Processing for Real-Time Hand Gesture Recognition”, Sensors 2023, vol. 23, No. 1, pp. 1-20, Dec. 20, 2022.

International Search Report and Written Opinion dated Jun. 21, 2024, issued in International Application No. PCT/KR2024/003187.

Indian Office Action dated Jul. 8, 2025, issued in an Indian Patent Application No. 202341017582.

European Search Report dated Jan. 2, 2026, issued in European Application No. 24771174.0.

Fan Zhang et al., MediaPipe Hands: On-device Real-time Hand Tracking, XP081698245, Jun. 18, 2020, Ithaca, New York.

Meng et al., 3D Interacting Hand Pose Estimation by Hand Deocclusion and Removal, ECCV 2022.

Park et al., HandOccNet: Occlusion-Robust 3D Hand Mesh Estimation Network, CVPR 2022.

* cited by examiner

FIG. 2

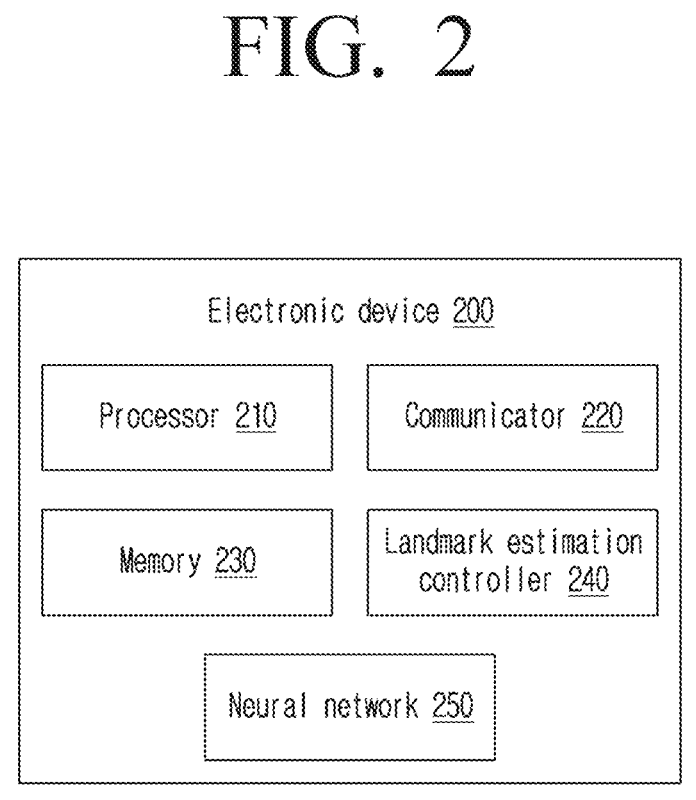

Electronic device 200

Processor 210

Communicator 220

Memory 230

Landmark estimation controller 240

Neural network 250

COMPUTATIONALLY ADAPTIVE OCCLUSION AWARE HAND LANDMARK ESTIMATION

CROSS-REFERENCE TO RELATED APPLICATIONS

This application is a continuation application, claiming priority under § 365(c), of an of International Application No. PCT/KR2024/003187, filed on Mar. 12, 2024 which is based on and claims the benefit of an Indian Provisional patent application No. 20/234,1017582, filed on Mar. 15, 2023, in the Indian Patent Office, and of an Indian Complete patent application Ser. No. 20/234,1017582, filed on Feb. 13, 2024, in the Indian Patent Office, the disclosure of each of which is incorporated by reference herein in its entirety.

BACKGROUND

Field

The disclosure relates to an Augmented Reality (AR) system and method. More particularly, the disclosure relates to a method and an electronic device for estimating a landmark point of a body part (e.g., hand) of a subject.

Description of Related Art

Hand Landmark (HLM) estimation is an essential component in tasks such as gesture detection and hand rendering in an immersive system (e.g., AR system, virtual reality (VR) system and the like). Accurate hand landmark estimation requires computationally expensive neural networks which requires more processing time. An efficient method for hand key point estimation is required for real-time deployment on devices such as Video See Though (VST) and robots. The existing methods for hand landmarks are not computationally "occlusion-aware". This means that the existing methods require same number of computations to detect landmarks in regions regardless of the presence of occlusion. But, very accurate estimation of the hand landmarks in the occluded regions is not possible due to the fundamental unavailability of an input data. Hence, a differential computation based on the presence of occlusion in the scene can help reduce improve the performance of the neural networks. However, current methods do not have the capability for differential computation in the presence of occlusion.

FIG. 1 depicts an example scenario, where a hand is occluded by an object (e.g., bottle and the like), according to the related art.

Referring to FIG. 1, in a scenario 100, a diameter of a circle represent an uncertainty of predictions of the hand, wherein the landmarks in occluded regions have higher uncertainty (shown in green color). Hence, lower complexity operations may be used to determine these landmarks, since the theoretical upper limit for accuracy is lower. However, existing methods are not computationally occlusion-aware. This results in increased computation time.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide methods and systems (e.g., electronic device and the like) for occlusion aware spatially adaptive differential computation for hand landmark localization, wherein an occlusion map is first computed to determine the probability of occlusion in a scene. The hand landmark estimation comprises a coarse estimator followed by multiple light-weight fine estimators, and the number of fine estimators deployed for each landmark is determined by the occlusion probability map.

Another aspect of the disclosure is to perform the hand landmark estimation with spatially adaptive variable computation based on a level of occlusion in the scene.

Another aspect of the disclosure is to perform a coarse-to-fine HLM correction using a plurality of light weight Deep Neural Network (DNN) sequences, wherein the number of Deep Neural Network (DNNs) in each sequence is determined by the level of occlusion in the scene.

Additional aspects will be set forth in part in the description which follows and, in part, will be apparent from the description, or may be learned by practice of the presented embodiments.

In accordance with an aspect of the disclosure, a method performed by an electronic device for estimating a landmark point of a body part of a subject is provided. The method includes generating, by the electronic device, an initial coarse estimation of the landmark point of the body part using a light-weight deep neural network, determining, by the electronic device, an occluded region of the body part based on the generated initial coarse estimation of the landmark point using a segmentation mask, estimating, by the electronic device, an occlusion probability for the landmark point in the at least one occluded region and the generated initial coarse estimation, determining, by the electronic device, a correction factor for applying on the generated initial coarse estimation as a measure of the estimated occlusion probability, and selecting, by the electronic device, a pre-defined number of neural networks by applying the determined correction factor for processing the at least one occluded region and the generated initial coarse estimation to generate final estimation of the landmark point.

In an embodiment, the pre-defined number of the neural networks in each neural network sequence is inversely proportional to the determined correction factor of the landmark estimation.

In an embodiment, the light-weight deep neural network predicts a confidence score associated with the initial coarse estimation of the landmark point of the body part.

In an embodiment, the segmentation mask is generated by estimating a hand bounding box, performing a skin segmentation, performing a connected component analysis for the hand bounding box and the skin segmentation to join a component of the body part of the subject, and generating the segmentation mask based on the joined component of the body part of the subject.

In an embodiment, the occlusion probability for the landmark point is estimated from an occlusion map. The occlusion probability differentiates between occlusion due to at least one external object, a self-occlusion by the body part of the subject and a self-occlusion by another body part of the subject.

In accordance with another aspect of the disclosure, an electronic device is provided. The electronic device includes memory storing one or more computer programs, a landmark estimation controller, and one or more processors communicatively coupled to the landmark estimation controller and the memory, wherein the one or more computer programs include computer-executable instructions that, when executed by the one or more processors, cause the electronic device to generate an initial coarse estimation of a landmark point of a body part of a subject using a light-weight deep neural network, determine an occluded region of the body part based on the generated initial coarse estimation of the landmark points using a segmentation mask, estimate an occlusion probability for the landmark point in the at least one occluded region and the generated initial coarse estimation, determine a correction factor for applying on the generated initial coarse estimation as a measure of the estimated occlusion probability, and select a pre-defined number of neural networks by applying the determined correction factor, for processing the at least one occluded region and the generated initial coarse estimation to generate final estimation of the at least one landmark point.

In accordance with another aspect of the disclosure, one or more non-transitory computer-readable storage media storing one or more computer programs including computer-executable instructions that, when executed by one or more processors of an electronic device, cause the electronic device to perform operations for estimating at least one landmark point of a body part of a subject are provided. The operations include generating, by the electronic device, an initial coarse estimation of the at least one landmark point of the body part using a light-weight deep neural network, determining, by the electronic device, at least one occluded region of the body part based on the generated initial coarse estimation of the at least one landmark point using a segmentation mask, estimating, by the electronic device, an occlusion probability for the at least one landmark point in the at least one occluded region and the generated initial coarse estimation, determining, by the electronic device, a correction factor for applying on the generated initial coarse estimation as a measure of the estimated occlusion probability, and selecting, by the electronic device, a pre-defined number of neural networks by applying the determined correction factor, for processing the at least one occluded region and the generated initial coarse estimation to generate final estimation of the at least one landmark point.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 2 shows various hardware components of an electronic device, according to an embodiment of the disclosure;

Throughout the drawings, it should be noted that like reference numbers are used to depict the same or similar elements, features, and structures.

DETAILED DESCRIPTION

Figure 1:
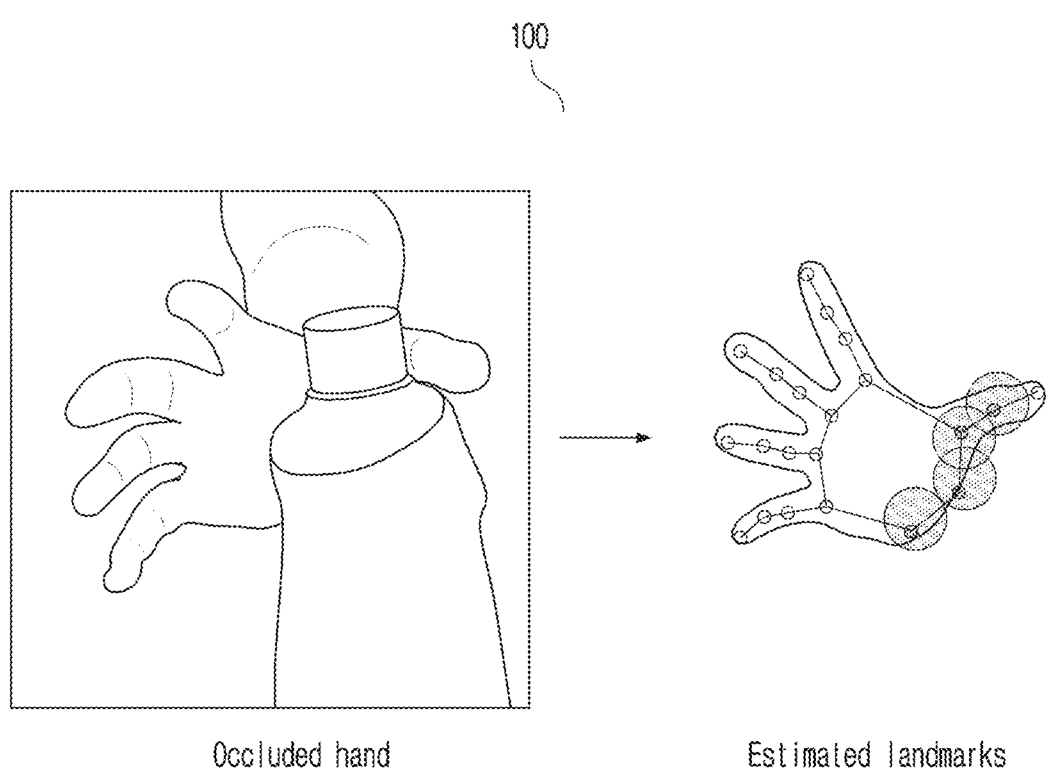
FIG. 1 depicts an example scenario, where a hand is occluded, according to the related art.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The words/phrases "exemplary", "example", "illustration", "in an instance", "and the like", "and so on", "etc.", "etcetera", "e.g.,", "i.e.," are merely used herein to mean "serving as an example, instance, or illustration." Any embodiment or implementation of the subject matter described herein using the words/phrases "exemplary", "example", "illustration", "in an instance", "and the like", "and so on", "etc.", "etcetera", "e.g.,", "i.e.," is not necessarily to be construed as preferred or advantageous over other embodiments.

Embodiments herein may be described and illustrated in terms of blocks which carry out a described function or functions. These blocks, which may be referred to herein as managers, units, modules, hardware components and the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by a firmware. The circuits, for example, are embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

It should be noted that elements in the drawings are illustrated for the purposes of this description and ease of understanding and may not have necessarily been drawn to scale. For example, the flowcharts/sequence diagrams illustrate the method in terms of the steps required for understanding of aspects of the embodiments as disclosed herein. Furthermore, in terms of the construction of the device, one or more components of the device may have been represented in the drawings by conventional symbols, and the drawings may show only those specific details that are pertinent to understanding the embodiments so as not to obscure the drawings with details that will be readily apparent to those of ordinary skill in the art having the benefit of the description herein. Furthermore, in terms of the system, one or more components/modules which comprise the system may have been represented in the drawings by conventional symbols, and the drawings may show only those specific details that are pertinent to understanding the embodiments so as not to obscure the drawings with details that will be readily apparent to those of ordinary skill in the art having the benefit of the description herein.

The accompanying drawings are used to help easily understand various technical features and it should be understood that the embodiments presented herein are not limited by the accompanying drawings. As such, the disclosure should be construed to extend to any modifications, equivalents, and substitutes in addition to those which are particularly set out in the accompanying drawings and the corresponding description. Usage of words such as first, second, third etc., to describe components/elements/steps is for the purposes of this description and should not be construed as sequential ordering/placement/occurrence unless specified otherwise.

The embodiments herein achieve methods for estimating a landmark point of a body part of a subject. The method includes generating, by an electronic device, an initial coarse estimation of the landmark point of the body part using a light-weight deep neural network. Further, the method includes determining, by the electronic device, an occluded region of the body part based on the generated initial coarse estimation of the landmark point using a segmentation mask. Further, the method includes estimating, by the electronic device, an occlusion probability for the landmark point in the occluded region and the generated initial coarse estimation. Further, the method includes determining, by the electronic device, a correction factor for applying on the initial coarse estimation as a measure of the estimated occlusion probability. Further, the method includes selecting, by the electronic device, a pre-defined number of neural networks by applying the correction factor for processing the occluded region and the initial coarse estimation to generate final estimation of the landmark point.

The methods and systems (i.e., electronic device) can be used for occlusion aware spatially adaptive differential computation for hand landmark localization, wherein an occlusion map is first computed to determine the probability of occlusion in a scene. The hand landmark estimation comprises a coarse estimator followed by multiple light-weight fine estimators, and the number of fine estimators deployed for each landmark is determined by the occlusion probability map.

Embodiments herein disclose a method for performing hand landmark correction in occluded regions. The method comprises estimating an initial coarse estimation of hand landmarks using a light-weight deep neural network. The method further includes estimating occluded hand regions in the initial coarse landmarks using a hand occlusion segmentation mask, and estimating an occlusion probability for each hand landmark point from the occlusion segmentation mask. The method comprises determining a level of coarse-fine correction based on the estimated occlusion probability, and deploying a plurality of coarse-fine networks correction for occluded regions based on the determined level of coarse-fine correction. The level of coarse-fine correction can be inversely proportional to the amount of occlusion.

The proposed method can be used to dynamically change computations for the hand landmark estimation. The proposed method uses less computations for estimating landmarks in the occluded regions and more computations in the non-occluded regions. The proposed method first estimates occluded hand regions using a light-weight deep network. Further, the initial coarse estimation of the landmarks are made using a light-weight network. For each landmark, an occlusion probability is obtained from the occlusion map. The level of coarse-fine correction is determined based on the occlusion probability. Next, a sequence of light-weight coarse-fine landmark correction networks are deployed for improving the landmark accuracy. For occluded regions, less coarse-fine landmark correction networks are deployed and vice versa. In this way, more computations are reserved for landmarks in well-defined regions, so as to improve computational efficiency.

The proposed method can be used to provide about changing the computational complexity based on occlusion, by means of executing a variable number of light weight networks. Hence, the method can be used to reduce the complexity of the hand landmark estimation based on occlusion in the scene. The method can be used to improve the execution time of hand landmark estimation using the adaptive variable computation based on the level of occlusion in the scene, which is a very common scenario for hands. This will help improve user experience in the AR devices such as VST, by eliminating algorithm lag.

It should be appreciated that the blocks in each flowchart and combinations of the flowcharts may be performed by one or more computer programs which include instructions. The entirety of the one or more computer programs may be stored in a single memory device or the one or more computer programs may be divided with different portions stored in different multiple memory devices.

Any of the functions or operations described herein can be processed by one processor or a combination of processors. The one processor or the combination of processors is circuitry performing processing and includes circuitry like an application processor (AP, e.g. a central processing unit (CPU)), a communication processor (CP, e.g., a modem), a graphics processing unit (GPU), a neural processing unit (NPU) (e.g., an artificial intelligence (AI) chip), a Wi-Fi chip, a Bluetooth® chip, a global positioning system (GPS) chip, a near field communication (NFC) chip, connectivity chips, a sensor controller, a touch controller, a finger-print sensor controller, a display drive integrated circuit (IC), an audio CODEC chip, a universal serial bus (USB) controller, a camera controller, an image processing IC, a microprocessor unit (MPU), a system on chip (SoC), an integrated circuit (IC), or the like.

Referring now to the drawings, and more particularly to FIGS. 2 through 9, where similar reference characters denote corresponding features consistently throughout the figures, there are shown at least one embodiment.

FIG. 2 shows various hardware components of an electronic device, according to an embodiment of the disclosure.

An electronic device 200 is, for example, but not limited to a laptop, a smart phone, a desktop computer, a notebook, a Device-to-Device (D2D) device, a vehicle to everything (V2X) device, a foldable phone, a smart TV, a tablet, an immersive device, an internet of things (IOT) device, a VR device, an XR device, an AR device, and a VST device.

Referring to FIG. 2, the electronic device 200 includes a processor 210, a communicator 220, memory 230, a landmark estimation controller 240 and a neural network (e.g., light-weight deep neural network and the like) 250. The processor 210 is coupled with the communicator 220, the memory 230, the landmark estimation controller 240 and the neural network 250.

The landmark estimation controller 240 generates an initial coarse estimation of a landmark point of a body part of a subject (e.g., human) using the light-weight deep neural network 250. The body part may be a hand, but it is also applicable to other body parts (e.g., leg and the like). The patent disclosure is explained in the context of hand, but it is applicable and expand to other body part (e.g., leg, finger, head and the like). In an embodiment, the light-weight deep neural network predicts a confidence score associated with the initial coarse estimation of the landmark point of the body part. The confidence score is a value between 0 and 1. A higher value of the confidence score means the network is more confident that there is a key-point. This confidence is also related to the occlusion level. The confidence values are lower if there is an occlusion in the scene. In an embodiment, the light weight neural network could be a shallow network with only a few layers. In another embodiment, the light weight neural network could be a network with very lightweight operations such as depth separable convolutions.

Figure 4:
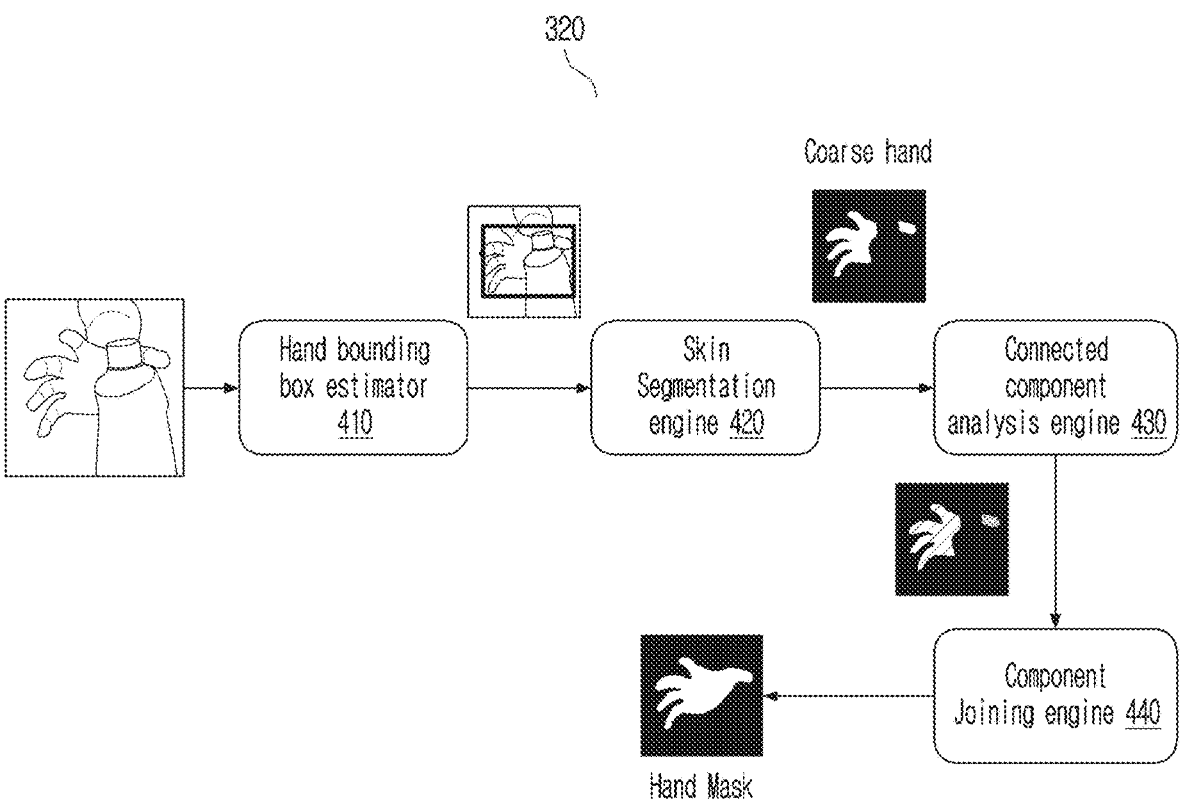
FIG. 4 shows various hardware components of a hand area segmentation engine included in a landmark estimation controller, according to an embodiment of the disclosure.

Further, the landmark estimation controller 240 determines an occluded region of the body part based on the generated initial coarse estimation of the landmark points using a segmentation mask (explained in FIG. 4). In an embodiment, the segmentation mask is generated by estimating a hand bounding box, performing a skin segmentation, performing a connected component analysis for the hand bounding box and the skin segmentation to join a component of the body part of the subject, and generating the segmentation mask based on the joined component of the body part of the subject.

Further, the landmark estimation controller 240 estimates the occlusion probability for the landmark point in the occluded region and the generated initial coarse estimation. The occlusion probability for the landmark point is estimated from an occlusion map. The occlusion probability differentiates between occlusion due to at least one external object, a self-occlusion by the body part of the subject and a self-occlusion by another body part of the subject.

Further, the landmark estimation controller 240 determines a correction factor for applying on the initial coarse estimation as a measure of the estimated occlusion probability. Further, the landmark estimation controller 240 selects a pre-defined number of neural networks by applying the correction factor, for processing the occluded region and the initial coarse estimation to generate final estimation of the landmark point. The pre-defined number of the neural networks in each neural network sequence is inversely proportional to the correction factor of the landmark estimation. In an example, the correction level is the number of neural network applied. The maximum value is pre-defined empirically (e.g., 10 neural networks).

The landmark estimation controller 240 is implemented by analog and/or digital circuits such as logic gates, integrated circuits, microprocessors, microcontrollers, memory circuits, passive electronic components, active electronic components, optical components, hardwired circuits and the like, and may optionally be driven by firmware.

The processor 210 may include one or a plurality of processors. The one or the plurality of processors may be a general-purpose processor, such as a central processing unit (CPU), an application processor (AP), and the like, a graphics-only processing unit such as a graphics processing unit (GPU), a visual processing unit (VPU), and/or an AI-dedicated processor such as a neural processing unit (NPU). The processor 210 may include multiple cores and is configured to execute the instructions stored in the memory 230.

Further, the processor 210 is configured to execute instructions stored in the memory 230 and to perform various processes. The communicator 220 is configured for communicating internally between internal hardware components and with external devices via one or more networks. The memory 230 also stores instructions to be executed by the processor 210. The memory 230 may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory 230 may, in some examples, be considered a non-transitory storage medium. The term "non-transitory" may indicate that the storage medium is not embodied in a carrier wave or a propagated signal. However, the term "non-transitory" should not be interpreted that the memory 230 is non-movable. In certain examples, a non-transitory storage medium may store data that can, over time, change (e.g., in Random Access Memory (RAM) or cache).

Further, at least one of the pluralities of modules/controller may be implemented through an Artificial intelligence (AI) model using a data driven controller (not shown). The data driven controller (not shown) can be a machine learning (ML) model based controller and AI model based controller. A function associated with the AI model may be performed through the non-volatile memory, the volatile memory, and the processor 210. The processor 210 may include one or a plurality of processors. At this time, one or a plurality of processors may be a general purpose processor, such as a central processing unit (CPU), an application processor (AP), and the like, a graphics-only processing unit such as a graphics processing unit (GPU), a visual processing unit (VPU), and/or an AI-dedicated processor such as a neural processing unit (NPU).

The one or a plurality of processors control the processing of the input data in accordance with a predefined operating rule or AI model stored in the non-volatile memory and the volatile memory. The predefined operating rule or artificial intelligence model is provided through training or learning.

Here, being provided through learning means that a predefined operating rule or AI model of a desired characteristic is made by applying a learning algorithm to a plurality of learning data. The learning may be performed in a device itself in which AI according to an embodiment is performed, and/or may be implemented through a separate server/system.

The AI model may comprise of a plurality of neural network layers. Each layer has a plurality of weight values, and performs a layer operation through calculation of a previous layer and an operation of a plurality of weights. Examples of neural networks include, but are not limited to, convolutional neural network (CNN), deep neural network (DNN), recurrent neural network (RNN), restricted Boltzmann Machine (RBM), deep belief network (DBN), bidirectional recurrent deep neural network (BRDNN), generative adversarial networks (GAN), and deep Q-networks.

The learning algorithm is a method for training a predetermined target device (for example, a robot) using a plurality of learning data to cause, allow, or control the target device to make a determination or prediction. Examples of learning algorithms include, but are not limited to, supervised learning, unsupervised learning, semi-supervised learning, or reinforcement learning.

In an embodiment, the communicator 220 (i.e., transceiver) includes an electronic circuit specific to a standard that enables wired or wireless communication. The communicator 220 is configured to communicate internally between internal hardware components of the electronic device 200 and with external devices via one or more networks.

Although the FIG. 2 shows various hardware components of the electronic device 200 but it is to be understood that other embodiments are not limited thereon. In other embodiments, the electronic device 200 may include less or more components. Further, the labels or names of the components are used only for illustrative purpose and does not limit the scope of the disclosure. One or more components can be combined together to perform same or substantially similar function in the electronic device 200.

Figure 3:
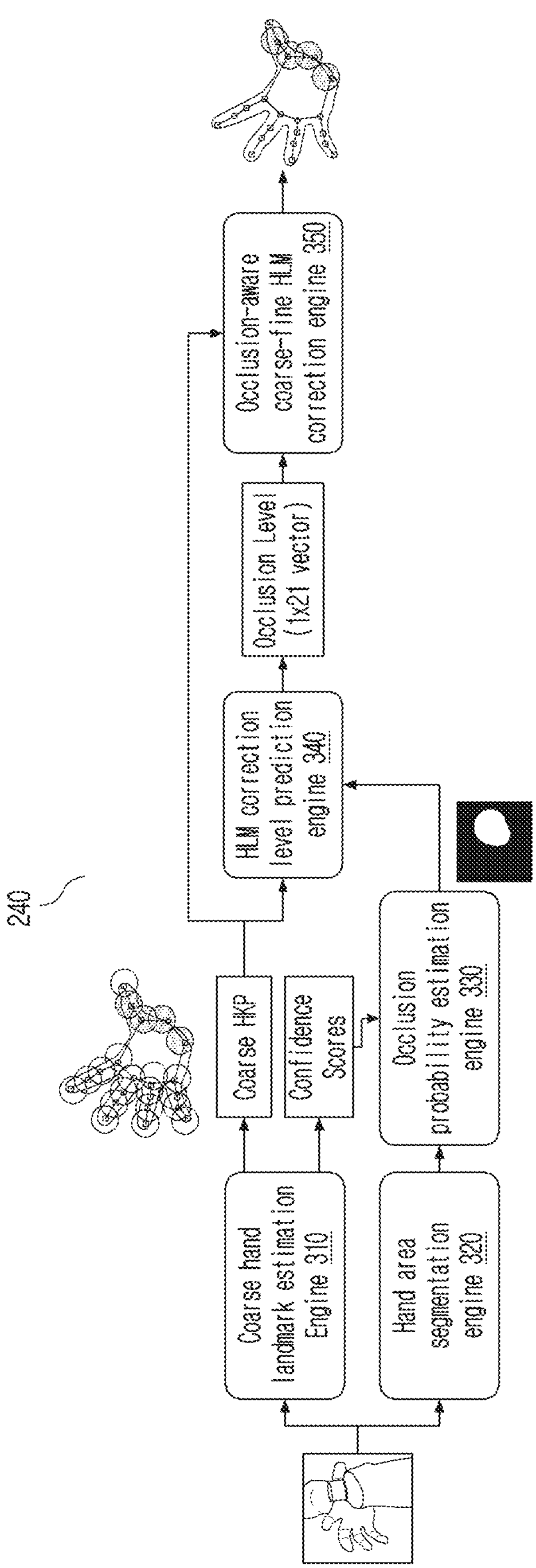
FIG. 3 shows various hardware components of a landmark estimation controller included in an electronic device, according to an embodiment of the disclosure.

FIG. 3 shows various hardware components of a landmark estimation controller included in an electronic device, according to an embodiment of the disclosure.

Referring to FIG. 3, the landmark estimation controller 240 includes a coarse hand landmark estimation engine 310, a hand area segmentation engine 320, an occlusion probability estimation engine 330, a HLM correction level prediction engine 340 and an occlusion-aware coarse-fine HLM correction engine 350. The coarse hand landmark estimation engine 310, the hand area segmentation engine 320, the occlusion probability estimation engine 330, the HLM correction level prediction engine 340 and the occlusion-aware coarse-fine HLM correction engine 350 are communicated with each other.

In the coarse hand landmark estimation engine 310, the lightweight network (e.g., light-weight deep neural network and the like) 250 is used to estimate the coarse hand landmark. This output will have low bias and higher variance in the estimation of the key-points. The confidence scores of each predicted hand landmark is predicted.

Further, the hand area segmentation engine 320 generates the hand mask to get hand area. Components such as skin-color based segmentation is used in the hand area segmentation engine 320. The operations of the hand area segmentation engine 320 is explained in FIG. 4.

Further, the occlusion probability estimation engine 330 receives the hand segmentation mask along with the confidence score. Further, the hand segmentation mask along with the confidence score is used to generate the occlusion probability estimation mask. The hand segmentation mask along with the confidence score help differentiate between occlusion due to external objects and self-occlusion (occlusion by the hand). The external object may be, for example, but not limited to, a bottle hold by the hand, the smart phone hold by the hand and the like. The operation of the occlusion probability estimation engine 330 is explained in FIG. 5.

Further, the HLM correction level prediction engine 340 computes the occlusion level from the occlusion mask for each land mark. The occlusions due to external objects will have higher occlusion levels than self-occlusion. The unoccluded landmarks will have occlusion level of 0. Further, the occlusion-aware coarse-fine HLM correction engine 350 includes an array of light weigh networks. The number of low networks executed for each landmark correction is inversely proportional to the level of occlusion. The operation of the occlusion-aware coarse-fine HLM correction engine 350 is explained in FIG. 6.

The coarse hand landmark estimation engine 310, the hand area segmentation engine 320, the occlusion probability estimation engine 330, the HLM correction level prediction engine 340 and the occlusion-aware coarse-fine HLM correction engine 350 are implemented by analog and/or digital circuits such as logic gates, integrated circuits, microprocessors, microcontrollers, memory circuits, passive electronic components, active electronic components, optical components, hardwired circuits and the like, and may optionally be driven by firmware.

Although the FIG. 3 shows various hardware components of the landmark estimation controller 240 but it is to be understood that other embodiments are not limited thereon. In other embodiments, the landmark estimation controller 240 may include less or more components. Further, the labels or names of the components are used only for illustrative purpose and does not limit the scope of the disclosure. One or more components may be combined together to perform same or substantially similar function in the landmark estimation controller 240.

FIG. 4 shows various hardware components of a hand area segmentation engine included in a landmark estimation controller, according to an embodiment of the disclosure.

Referring to FIG. 4, the hand area segmentation engine 320 includes a hand bounding box estimator 410, a skin segmentation engine 420, a connected component analysis engine 430 and a component joining engine 440.

The hand bounding box estimator 410 estimates the hand bounding box. The skin segmentation engine 420 performs the skin segmentation. The connected component analysis engine 430 performs the connected component analysis for the hand bounding box and the skin segmentation to join the component of the body part of the subject. Based on the joined component of the body part of the subject, the component joining engine 440 generates the segmentation mask.

The hand bounding box estimator 410, the skin segmentation engine 420, the connected component analysis engine 430 and the component joining engine 440 are implemented by analog and/or digital circuits such as logic gates, integrated circuits, microprocessors, microcontrollers, memory circuits, passive electronic components, active electronic components, optical components, hardwired circuits and the like, and may optionally be driven by firmware.

Although the FIG. 4 shows various hardware components of the hand area segmentation engine 320 but it is to be understood that other embodiments are not limited thereon. In other embodiments, the hand area segmentation engine 320 may include less or more components. Further, the labels or names of the components are used only for illustrative purpose and does not limit the scope of the disclosure. One or more components may be combined together to perform same or substantially similar function in the hand area segmentation engine 320.

Figure 5:
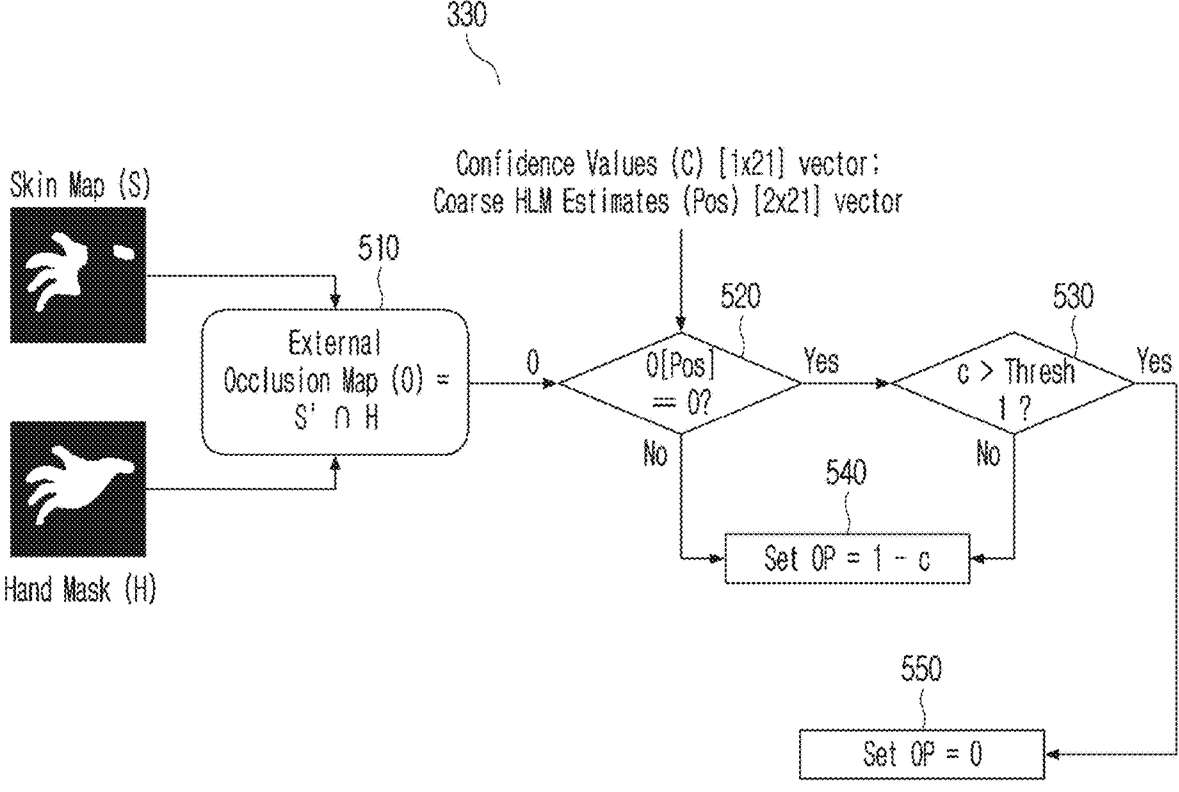
FIG. 5 is an example scenario in which an operation of an occlusion probability estimation engine included in a landmark estimation controller is explained, according to an embodiment of the disclosure.

FIG. 5 is an example scenario in which an operation of an occlusion probability estimation engine included in a landmark estimation controller is explained, according to an embodiment of the disclosure.

Referring to FIG. 5, at operation 510, the occlusion probability estimation engine 330 receives the skin map (S) and the hand mask (H) to determine the external Occlusion Map (O) equal to S'∩H. At operation 520, the occlusion probability estimation engine 330 receives the confidence values (C) [1×21] vector and coarse HLM Estimates (Pos) [2×21] vector to determine O[Pos]==0?

At operation 530, the occlusion probability estimation engine 330 that if O[pos] is zero, then the confidence value is checked. If the confidence is greater than a threshold, then it is assumed that there is no occlusion and the occlusion probability is set 0.

At operation 540, the occlusion probability estimation engine 330 determines that the value of the occlusion map at the coarse location is checked O[pos]. If it is non zero, the occlusion probability (OP) is set as 1—confidence score (c).

At operation 550, the occlusion probability estimation engine 330 that if O[pos] is zero, then the confidence value is checked. If the confidence is greater than a threshold, then it is assumed that there is no occlusion and the occlusion probability is set 0.

If the HLM is predicted with the higher confidence, and the external occlusion probability obtained from the occlusion map is zero, then occlusion probability for that the HLM is set to 0. If the higher is the HLM confidence then, occlusion probability estimation engine 330 lowers the occlusion probability. Further, please equation used for determine the correction level.

$$\text{Correction Level} = \text{ceil}((1-0P)*(N-M)+M) \qquad \text{Equation 1}$$

Wherein the maximum Level: N (Maximum number of LWNets that may be executed for an HLM) (Predetermined), and minimum Level: M (Minimum number of LWNets to be executed for an HLM) (Predetermined, M, N: predefined numbers, OP—Occlusion Probability, Values in [c] are between 0 and 1, The below table indicates the Occlusion Probability and the level (for example).

TABLE 1

| Occlusion Probability | M | N | Level |
|---|---|---|---|
| 0 (No occlusion) | 1 | 10 | 10 |
| 0.5 (Partial occlusion) | 1 | 10 | 6 |
| 1 (High occlusion) | 1 | 10 | 1 |

Figure 6:
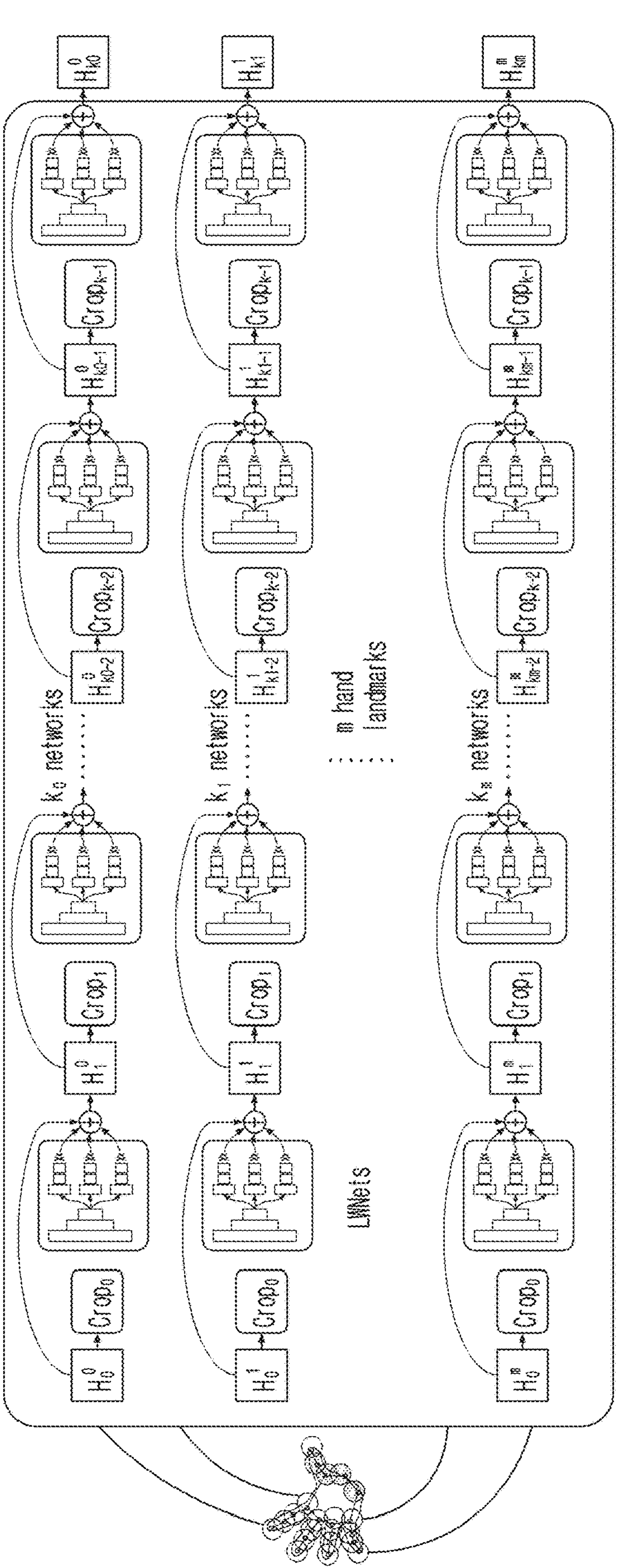
FIG. 6 an example scenario in which an operation of an occlusion-aware coarse-fine HLM correction engine included in a landmark estimation controller is explained, according to an embodiment of the disclosure.

FIG. 6 an example scenario in which an operation of an occlusion-aware coarse-fine HLM correction engine included in a landmark estimation controller is explained according to an embodiment of the disclosure.

The occlusion-aware coarse-fine HLM correction engine 350 includes a matrix of networks, wherein each row of networks denotes a correction for a single landmark. The number of networks to be executed for each row (k_r) is determined by the occlusion map. Higher occlusion of a landmark means, less number of k_r will be executed for the corresponding row.

In the occlusion-aware coarse-fine HLM correction engine 350, the coarse estimation of HLM and occlusion levels passed as input. Each land mark processed by separate row of LW CNNs. Each row (r) has $k_r$ LW CNNs. The HLM updated in a coarse-fine manner after every LW Network. Image crops around updated keypoint value passed to subsequent LW Net, where k_r is higher for less occlusion and vice versa. In this way, only un-occluded land marks will be processed by high computational power In this example, 10 land marks are occluded. Hence, less number of LW Nets will be executed. In this examples, 2 networks are executed for occluded landmarks and 10 for visible landmarks. Hence a total of 11*10+10*2=130 LW Nets will be executed. In contrast, without proposed methods, the computation requirements would be equivalent to that of executing 21*10=210 LWNets. The proposed method may be used to improve the execution time.

Figure 7:
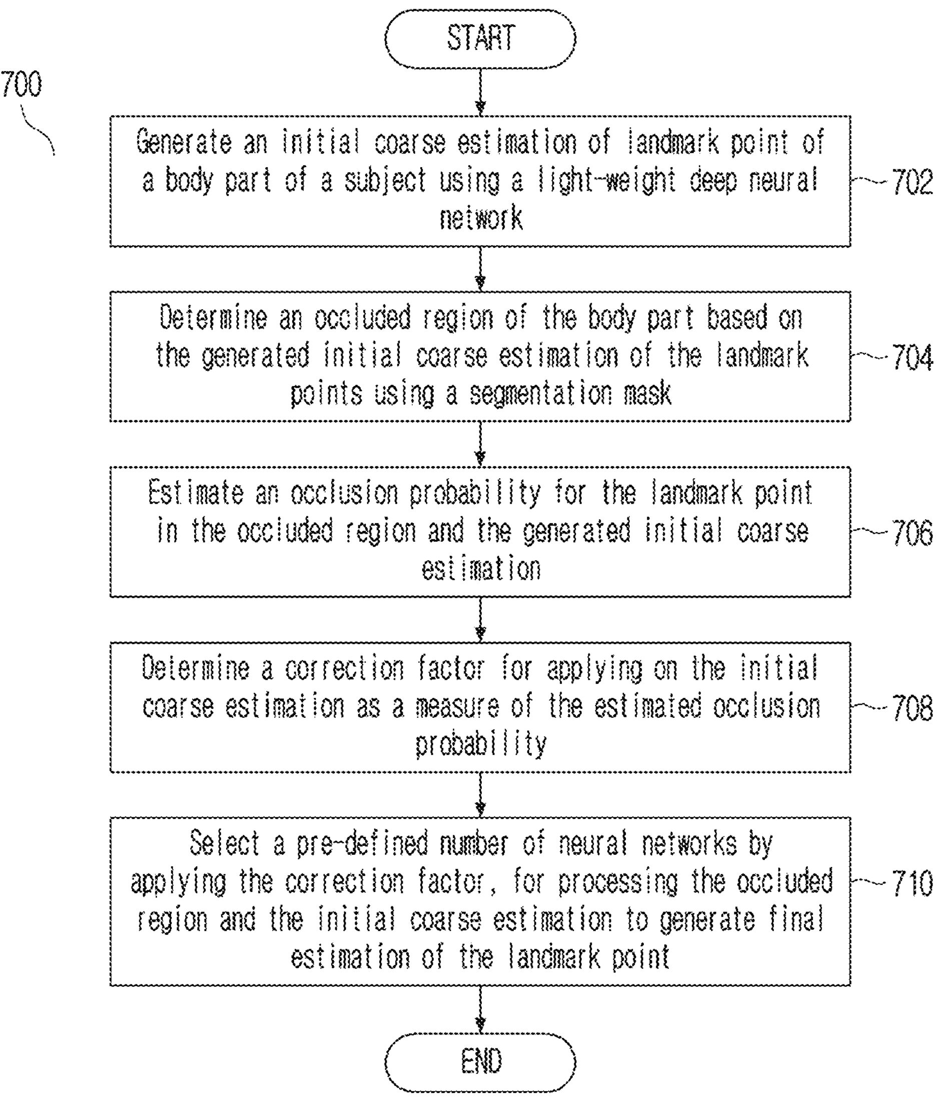
FIG. 7 is a flowchart illustrating a method for estimating a landmark point of a body part of a subject, according to an embodiment of the disclosure.

FIG. 7 is a flowchart illustrating a method for estimating the landmark point of the body part of the subject, according to an embodiment of the disclosure.

Referring to FIG. 7, in a method 700, the operations 702-710 are handled by the landmark estimation controller 240.

At operation 702, the method includes generating the initial coarse estimation of the landmark point of the body part using the light-weight deep neural network 250. At operation 704, the method includes determining the occluded region of the body part based on the generated initial coarse estimation of the landmark point using the segmentation mask. At operation 706, the method includes estimating the occlusion probability for the landmark point in the occluded region and the generated initial coarse estimation. At operation 708, the method includes determining the correction factor for applying on the initial coarse estimation as a measure of the estimated occlusion probability. At operation 710, the method includes selecting the pre-defined number of neural networks by applying the correction factor for processing the occluded region and the initial coarse estimation to generate final estimation of the landmark point.

The proposed method may be used to dynamically change computations for the hand landmark estimation. The proposed method uses less computations for estimating landmarks in occluded regions and more computations in the non-occluded regions. The proposed method first estimates occluded hand regions using the light-weight deep network. Further, the initial coarse estimation of the landmarks are made using a light-weight network. For each landmark, an occlusion probability is obtained from the occlusion map. The level of coarse-fine correction is determined based on the occlusion probability. Next, the sequence of light-weight coarse-fine landmark correction networks are deployed for improving the landmark accuracy. For occluded regions, less coarse-fine landmark correction networks are deployed and vice versa. In this way, more computations are reserved for landmarks in well-defined regions, so as to improve computational efficiency.

The method may be used to improve the execution time of hand landmark estimation using the adaptive variable computation based on the level of occlusion in the scene, which is a very common scenario for hands. This will help improve user experience in the AR devices such as VST, by eliminating algorithm lag.

Figure 8:
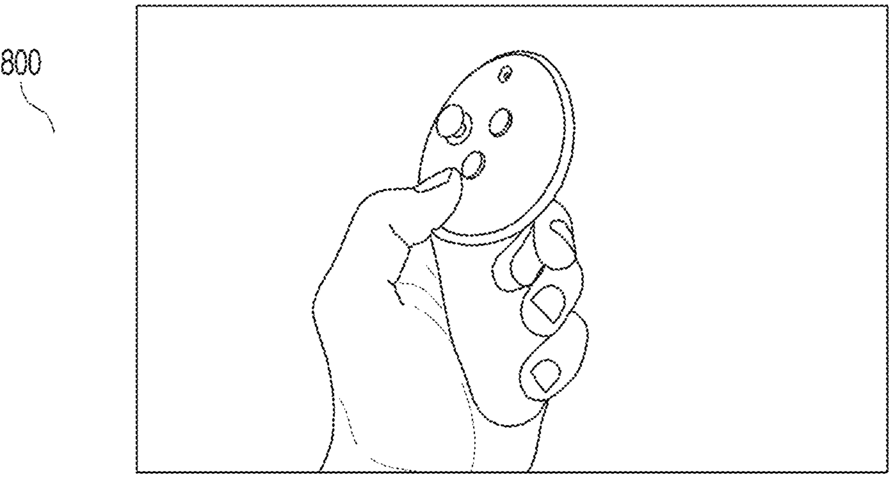
FIGS. 8 and 9 are example illustrations in which fast hand landmark estimation in a presence of an occlusion on a VST device is depicted, according to various embodiments of the disclosure.
Figure 9:
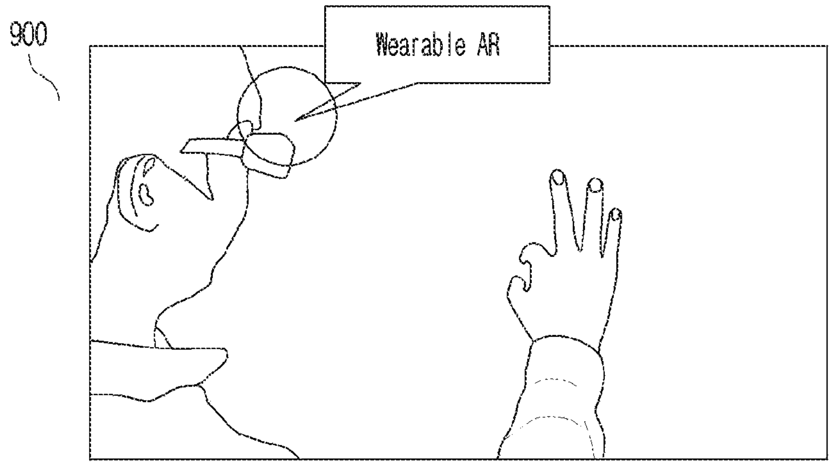

FIGS. 8 and 9 are example illustrations in which fast hand landmark estimation in a presence of an occlusion on a VST device is depicted, according to various embodiments of the disclosure.

Referring to FIG. 8, in an illustration 800, a controller is an essential input mode for an AR Glass device such as VST. A combination of the hand gesture and a controller input is used for the VST control. A lot of hand landmarks are occluded while holding the controller. In an example, only 10 landmarks are visible. The proposed method processes occluded landmarks using less computations. Hence, the proposed method can improve execution time.

Referring to FIG. 9, in an illustration 900, the gestures are primary mode of interaction with the VST device. A pinch gesture (as shown in FIG. 9) is an essential mode of communication, used for zooming in/out or picking of virtual objects. Typically ~50% of landmarks are occluded in this gesture. The proposed method can improve execution time. Similar, the proposed method can improve execution time in other gestures such as swipe (side view), finger pointing etc.

The various actions, acts, blocks, steps, and the like in the method 700 may be performed in the order presented, in a different order or simultaneously. Further, in some embodiments, some of the actions, acts, blocks, steps, and the like may be omitted, added, modified, skipped, and the like without departing from the scope of the disclosure.

The embodiments disclosed herein may be implemented through at least one software program running on at least one hardware device and performing network management functions to control the elements. The elements may be at least one of a hardware device, or a combination of hardware device and software module.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by an electronic device for estimating at least one landmark point of a body part of a subject, the method comprising:

generating, by the electronic device, an initial coarse estimation of the at least one landmark point of the body part using a light-weight deep neural network;

determining, by the electronic device, at least one occluded region of the body part based on the generated initial coarse estimation of the at least one landmark point using a segmentation mask;

estimating, by the electronic device, an occlusion probability for the at least one landmark point in the at least one occluded region and the generated initial coarse estimation;

determining, by the electronic device, a correction factor for applying on the generated initial coarse estimation as a measure of the estimated occlusion probability; and selecting, by the electronic device, a pre-defined number of neural networks by applying the determined correction factor, for processing the at least one occluded region and the generated initial coarse estimation to generate final estimation of the at least one landmark point.

2. The method of claim 1, wherein the pre-defined number of the neural networks in each neural network sequence is inversely proportional to the determined correction factor of the at least one landmark point estimation.

3. The method of claim 1, wherein light-weight deep neural network predicts a confidence score associated with the generated initial coarse estimation of at least one landmark point of the body part.

4. The method of claim 1, further comprising:

generating, by the electronic device, the segmentation mask, wherein the generating of the segmentation mask comprises:

estimating, by the electronic device, a hand bounding box;

performing, by the electronic device, a skin segmentation;

performing, by the electronic device, a connected component analysis for the hand bounding box and the skin segmentation to join at least one component of the body part of the subject; and generating, by the electronic device, the segmentation mask based on the at least one joined component of the body part of the subject.

5. The method of claim 1, wherein the occlusion probability for the at least one landmark point is estimated from an occlusion map, and wherein the occlusion probability differentiates between occlusion due to at least one external object, a self-occlusion by the body part of the subject and a self-occlusion by another body part of the subject.

6. An electronic device, comprising:

memory storing one or more computer programs; and one or more processors communicatively coupled to the memory, wherein the one or more computer programs include computer-executable instructions that, when executed by the one or more processors, cause the electronic device to:

generate an initial coarse estimation of at least one landmark point of a body part of a subject using a light-weight deep neural network, determine at least one occluded region of the body part based on the generated initial coarse estimation of the at least one landmark points using a segmentation mask, estimate an occlusion probability for the at least one landmark point in the at least one occluded region and the generated initial coarse estimation, determine a correction factor for applying on the generated initial coarse estimation as a measure of the estimated occlusion probability, and select a pre-defined number of neural networks by applying the correction factor, for processing the at least one occluded region and the generated initial coarse estimation to generate final estimation of the at least one landmark point.

7. The electronic device of claim 6, wherein the pre-defined number of the neural networks in each neural network sequence is inversely proportional to the correction factor of the at least one landmark point estimation.

8. The electronic device of claim 6, wherein the light-weight deep neural network predicts a confidence score associated with the generated initial coarse estimation of at least one landmark point of the body part.

9. The electronic device of claim 6, wherein the one or more computer programs further include computer-executable instructions that, when executed by the one or more processors, cause the electronic device to generate the segmentation mask, and wherein, to generate the segmentation mask, the one or more computer programs further include computer-executable instructions that, when executed by the one or more processors, cause the electronic device to:

estimate a hand bounding box, perform a skin segmentation, perform a connected component analysis for the hand bounding box and the skin segmentation to join at least one component of the body part of the subject, and generate the segmentation mask based on the at least one joined component of the body part of the subject.

10. The electronic device of claim 6, wherein the occlusion probability for the at least one landmark point is estimated from an occlusion map, and wherein the occlusion probability differentiates between occlusion due to at least one external object, a self-occlusion by the body part of the subject and a self-occlusion by another body part of the subject.

11. The electronic device of claim 8, wherein the segmentation mask is received together with the confidence score by an occlusion probability estimation engine.

12. The electronic device of claim 11, wherein the occlusion probability estimation engine is configured to receive a skin map(S) and a hand mask (H) to determine an external occlusion map (O) equal to an intersection of S and H.

13. The electronic device of claim 12, wherein the occlusion probability estimation engine is configured to receive confidence values (C) [1×21] vector and coarse hand landmark (HLM) estimates (Pos) [2×21] vector to determine O[Pos]==0.

14. The electronic device of claim 13, wherein, when O[Pos] is zero, the occlusion probability estimation engine is configured to check a confidence value.

15. The electronic device of claim 14, wherein, when confidence value is greater than a threshold, the occlusion probability estimation engine is configured to set the occlusion probability to 0.

16. One or more non-transitory computer-readable storage media storing one or more computer programs including computer-executable instructions that, when executed by one or more processors of an electronic device, cause the electronic device to perform operations for estimating at least one landmark point of a body part of a subject, the operations comprising:

generating, by the electronic device, an initial coarse estimation of the at least one landmark point of the body part using a light-weight deep neural network;

determining, by the electronic device, at least one occluded region of the body part based on the generated initial coarse estimation of the at least one landmark point using a segmentation mask;

estimating, by the electronic device, an occlusion probability for the at least one landmark point in the at least one occluded region and the generated initial coarse estimation;

determining, by the electronic device, a correction factor for applying on the generated initial coarse estimation as a measure of the estimated occlusion probability; and selecting, by the electronic device, a pre-defined number of neural networks by applying the determined correction factor, for processing the at least one occluded region and the generated initial coarse estimation to generate final estimation of the at least one landmark point.

17. The one or more non-transitory computer-readable storage media of claim 16, wherein the pre-defined number of the neural networks in each neural network sequence is inversely proportional to the correction factor of the at least one landmark point estimation.

18. The one or more non-transitory computer-readable storage media of claim 16, wherein light-weight deep neural network predicts a confidence score associated with the generated initial coarse estimation of at least one landmark point of the body part.

19. The one or more non-transitory computer-readable storage media of claim 16, the operations further comprising:

generating, by the electronic device, the segmentation mask, wherein the generating of the segmentation mask comprises:

estimating, by the electronic device, a hand bounding box;

performing, by the electronic device, a skin segmentation;

performing, by the electronic device, a connected component analysis for the hand bounding box and the skin segmentation to join at least one component of the body part of the subject; and generating, by the electronic device, the segmentation mask based on the at least one joined component of the body part of the subject.

20. The one or more non-transitory computer-readable storage media of claim 16, wherein the occlusion probability for the at least one landmark point is estimated from an occlusion map, and wherein the occlusion probability differentiates between occlusion due to at least one external object, a self-occlusion by the body part of the subject and a self-occlusion by another body part of the subject.

* * * * *